(12) United States Patent
Balabine et al.

(10) Patent No.: US 10,958,415 B2
(45) Date of Patent: Mar. 23, 2021

(54) METHOD, APPARATUS, AND COMPUTER-READABLE MEDIUM FOR SEARCHING POLYMORPHICALLY ENCRYPTED DATA

(71) Applicant: Informatica LLC, Redwood City, CA (US)

(72) Inventors: Igor Balabine, Menlo Park, CA (US); Richard Grondin, Québec (CA)

(73) Assignee: Informatica LLC, Redwood City, CA (US)

( * ) Notice: Subject to any disclaimer, the term of this patent is extended or adjusted under 35 U.S.C. 154(b) by 118 days.

(21) Appl. No.: 16/032,545

(22) Filed: Jul. 11, 2018

(65) Prior Publication Data

US 2020/0021428 A1    Jan. 16, 2020

(51) Int. Cl.
| | | |
|---|---|---|
| H04L 9/06 | (2006.01) | |
| G06F 16/903 | (2019.01) | |
| G06F 21/60 | (2013.01) | |
| H04L 9/32 | (2006.01) | |

(52) U.S. Cl.
CPC .......... H04L 9/0618 (2013.01); G06F 16/903 (2019.01); G06F 21/602 (2013.01); H04L 9/3213 (2013.01)

(58) Field of Classification Search
CPC ... H04L 9/0618; H04L 9/3213; G06F 16/903; G06F 21/602; G06F 21/6254
See application file for complete search history.

(56) References Cited

U.S. PATENT DOCUMENTS

| | | | | |
|---|---|---|---|---|
| 8,812,867 | B2* | 8/2014 | Jho | G06F 21/602 |
| | | | | 380/44 |
| 8,930,691 | B2* | 1/2015 | Kamara | G06F 21/6218 |
| | | | | 713/165 |
| 9,081,978 | B1* | 7/2015 | Connolly | G06F 21/62 |
| 9,646,172 | B1* | 5/2017 | Hahn | G06F 21/6227 |
| 9,760,637 | B2* | 9/2017 | Grubbs | G06F 16/951 |
| 10,007,803 | B2* | 6/2018 | Kaushik | H04L 67/1097 |
| 10,127,391 | B1* | 11/2018 | Whitmer | G06F 16/2228 |

(Continued)

OTHER PUBLICATIONS

Verheul et al., "Polymorphic encryption and pseudonymisation in identity management and medical research", Sep. 2017, NAW, p. 168-172. (Year: 2017).*

(Continued)

*Primary Examiner* — Matthew Smithers
(74) *Attorney, Agent, or Firm* — Amardeep S. Grewal; Sidharth Kapoor; Reed Smith LLP

(57) ABSTRACT

A method, apparatus, and computer-readable medium for searching polymorphically encrypted data includes generating one or more pseudonymous tokens by encrypting a ciphertext using a first algorithm and an encryption key, the first algorithm comprising a polymorphic algorithm configured to generate a distinct pseudonymous token for each application of the polymorphic algorithm to the same plaintext, storing, the one or more pseudonymous tokens in one or more data stores, and identifying data in the one or more data stores that corresponds to the ciphertext by querying the data store using a search token generated by encrypting the plaintext using a second algorithm and the encryption key, the search token being distinct from the one or more pseudonymous tokens.

20 Claims, 10 Drawing Sheets

(56) References Cited

U.S. PATENT DOCUMENTS

| | | | | |
|---|---|---|---|---|
| 10,176,207 | B1* | 1/2019 | Dawoud | G06F 17/30336 |
| 10,528,557 | B1* | 1/2020 | Chmil | G06F 16/245 |
| 2008/0133965 | A1* | 6/2008 | Basu | G06F 12/023 |
| | | | | 714/5.1 |
| 2014/0331044 | A1* | 11/2014 | Fujii | H04L 9/3239 |
| | | | | 713/165 |
| 2015/0356314 | A1* | 12/2015 | Kumar | G06F 16/2228 |
| | | | | 713/165 |
| 2016/0246828 | A1* | 8/2016 | Cho | G06F 16/2455 |
| 2017/0026350 | A1* | 1/2017 | Dawoud | G06F 21/602 |
| 2017/0048058 | A1* | 2/2017 | Ren | H04L 9/30 |
| 2017/0250798 | A1* | 8/2017 | Enga | H04L 9/30 |
| 2017/0262546 | A1* | 9/2017 | Chen | G06F 21/602 |
| 2018/0144152 | A1* | 5/2018 | Greatwood | G06F 21/6218 |
| 2018/0183571 | A1* | 6/2018 | Gajek | H04L 9/008 |
| 2018/0307859 | A1* | 10/2018 | LaFever | H04L 63/0407 |
| 2018/0349617 | A1* | 12/2018 | Wang | G06F 21/602 |
| 2019/0340381 | A1* | 11/2019 | Yavuz | G06F 16/13 |
| 2019/0342088 | A1* | 11/2019 | Eidson | G06F 21/6254 |

OTHER PUBLICATIONS

Luo et al., "Dynamic Searchable Encryption with Multi-User Private Search for Cloud Computing", 2015, IEEE, p. 176-182. (Year: 2015).*

Wang et al., "Multi-user Searchable Encryption with Fine-Grained Access Control without Key Sharing", 2015, IEEE, p. 145-150. (Year: 2015).*

* cited by examiner

| | 500A | 500B | 500C | 500D |
|---|---|---|---|---|
| | SSN | Income | City | Gender |
| | sew1rret3tf3234 | 150,000 | New York | F |
| | dasdqd3req2154 | 90,000 | Houston | F |
| | d32532tgsgf23r2 | 150,000 | Philadelphia | M |
| | dsadasdsadasd23 | 200,000 | New York | M |
| | asd23rfasf34tffas | 85,000 | Baltimore | F |
| | tf3t23tefewrt4ga | 95,000 | Houston | M |
| | asf23tewg54u6ju | 110,000 | Pittsburgh | M |

Fig. 5A

METHOD, APPARATUS, AND COMPUTER-READABLE MEDIUM FOR SEARCHING POLYMORPHICALLY ENCRYPTED DATA

BACKGROUND

In modern data science, or (big) data analytics, data is useful for many purposes. However, such flexible use of the data is often hindered by encryption. Traditional encryption is always for a particular party, namely the party that has the decryption key. No-one else can decrypt. The decision who can decrypt has to be taken at the moment of encryption. In a multiple-use scenario, for example, where data is encrypted, many parties must have the key. This often undermines the protection level of the underlying data.

With the implementation of GDPR (General Data Protection Regulation), a harmonized data protection law framework across the European Union (EU) was created, which aimed to give individuals back the control of their personal data, whilst imposing strict rules on those hosting and processing this data, anywhere in the world. The GDPR sets forth stringent requirements on how Personally Identifiable Information (PII) should be used and disposed of. The GDPR specifies a "right-to-be-forgotten" that provides data subjects (such as individuals) the right to have their provided data be withdrawn.

The GDPR regulation discusses the use of pseudonymizing as a means of protecting an individual's personal data. Generally, pseudonymizing implies separation of data elements which can be used to identify a specific person. For example, separating an individual's name or a common identification number (e.g., passport number or Social Security Number), from the data being tracked (e.g., the goods purchased by the individual).

Contemporary pseudonymizing mechanisms use tokenization and multi-key standard symmetric encryption with multiple cryptographic keys and staging databases. However, both of these solutions have the significant drawbacks of requiring additional storage for mapping cryptographic attributes to the instances of pseudonymized data object and for keeping generated tokens. Moreover, the symmetric encryption mechanism requires safeguarding multiple cryptographic keys. The requirement for storing additional meta-information increases the solution's maintenance costs and weakens security posture by exposing additional bread crumps to a potential intruder.

Recently a pseudonymizing mechanism based on asymmetric polymorphic encryption has been proposed. The pseudonymizing mechanism is based on polymorphic properties of the elliptic curve variant of the ElGamal algorithm in the encryption mode of operation. However, the practicability of this approach is at best questionable due to an extremely high performance cost of ElGamal encryption operation. Moreover, ElGamal along with all other contemporary public key schemes such as RSA or Diffie-Hellman have proven susceptible to quantum cryptographic attacks.

Conventional implementations directed to pseudonymizing data pertaining to PII are not considered failsafe approach because they compromise either the lookup source data or the encryption keys and can lead to a compromise of personal and other potentially sensitive data. Thus, there is a need for technological improvements that enable searching of encrypted data, without decrypting the same, in order to match one or more encrypted sensitive data to one or more non-sensitive data.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIGS. 5A-5C illustrate an example of the search process that can be performed using the disclosed data structures and methods according to an exemplary embodiment.

DETAILED DESCRIPTION OF EXAMPLE EMBODIMENTS

Figure 1:
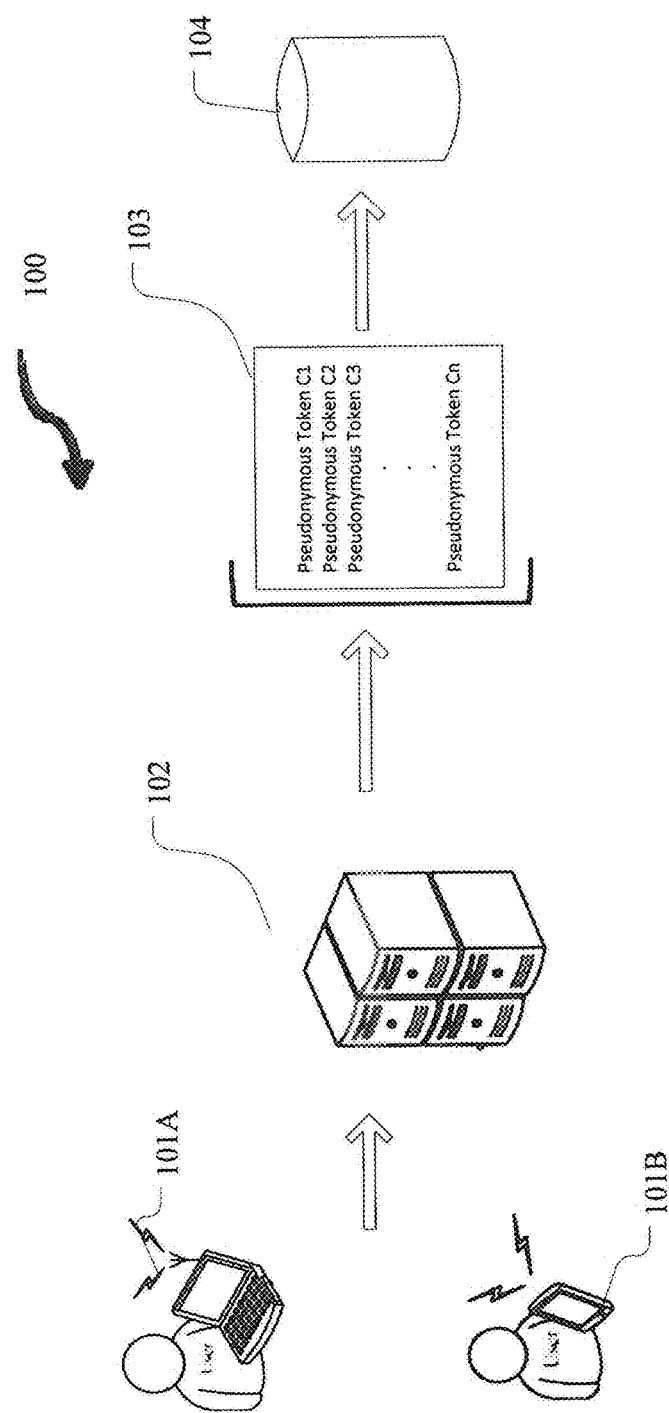
FIG. 1 illustrates a system for encrypting users' sensitive information or data.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems and methods disclosed herein, whether implemented independently of, or combined with, any other aspect of the disclosure. For example, a system can be implemented or a method can be practiced using any number of aspects set forth herein. In addition, the scope of the disclosure is intended to cover such a system or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

Detailed descriptions of the various implementations and variants of the system and methods of the disclosure are now provided. While many examples discussed herein are in the context of cryptography and searching encrypted data, it will be appreciated by one skilled in the art that the described systems and methods contained herein can be used in related technologies pertaining to encrypting proprietary, confidential or sensitive information. Myriad other example implementations or uses for the technology described herein would be readily envisioned by those having ordinary skill in the art, given the contents of the present disclosure.

The conventional technologies as noted above do not allow for analysis, access, updating, and retrieval of stored data without exposing 'raw' data (i.e., original data or plaintext data) that contains personal information.

The foregoing needs are satisfied by the present disclosure, which provides for, inter alia, methods, apparatuses, and computer readable medium for searching encrypted data. Example implementations described herein have innovative features, no single one of which is indispensable or solely responsible for their desirable attributes. Without limiting the scope of the claims, some of the advantageous features will now be summarized.

Applicants have discovered methods, systems and non-transitory computer readable mediums that can search encrypted data, without decrypting the same, in order to match one or more encrypted sensitive data to one or more non-sensitive data. That is, the inventive concepts are directed to pseudonymizing data objects and exercising the right to be forgotten by the means of polymorphic symmetric encryption. "Sensitive" may include, but not be limited to, confidential or proprietary information and/or data. The exemplary embodiments disclosed herein uses fast symmetric polymorphic cryptography, which is operated by a single key that does not require additional storage space. While fulfilling GDPR's requirements including traceability and "right to be forgotten," the methods, systems and non-transitory computer readable mediums disclosed herein enable an operator to trace pseudonymized data without knowing the plaintext. The disclosed methods, systems and non-transitory computer readable mediums are faster than the conventional methods of using a public key, require significantly less 1 storage and are less error prone than the conventional methods of requiring multiple cryptographic keys.

According to the example embodiments, a plaintext data object provided by a user is encrypted or protected with a first cryptographic key. This generates a first ciphertext. The first ciphertext is encrypted with a second cryptographic key by applying a polymorphic symmetric cipher algorithm. The encryption of the first ciphertext with the second cryptographic key is repeated a plurality of times, which generates a plurality of distinct ciphertexts. The second cryptographic key is later used to create a matching token to enable the owner of the second secret cryptographic key (i.e., a third party) to identify the distinct ciphertexts among other plurality of ciphertexts, without decrypting the distinct ciphertexts. The matching token is distinct from any of the plurality of ciphertexts. The owner of the first cryptographic key exercises the right to be forgotten by destroying the first cryptographic key.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Now referring to FIG. 1, a system 100 of receiving, encrypting and searching sensitive information or data, without decrypting the same, is depicted. Sensitive information or data can be referred to, for example, including but not limited to, data pertaining to personal data revealing racial or ethnic origin, political opinions, religious or philosophical beliefs, credit card information, banking information (i.e., account number and routing number), or trade-union membership, and the processing of genetic data, biometric data for the purpose of uniquely identifying a natural person, data concerning health or data concerning a natural person's sex life or sexual orientation (hereinafter referred to as "sensitive" information or data).

As shown in FIG. 1, the system 100 for encrypting a user's sensitive information or data is illustrated. One skilled in the art would appreciate that encryption is a type of security that converts data, programs, images or other information into unreadable cipher. This is done by using a collection of complex algorithms and a private key. The system 100 can include one or more users' 101A-101B, one or more servers 102, and a database 104 that stores a one or more of pseudonymous tokens 103 ($C_1$, $C_2$, $C_3$ . . . $C_n$. Pseudonymous tokens, or simply tokens will be described in greater detail below, and are items of data (such as records or fields in a relational database, fields in a semi-structured database, or values in unstructured data stores) that are generated through the pseudonymizing process described herein.

Each pseudonymous token corresponds to a unique ciphertext, although, as discussed below, each unique ciphertext can correspond to multiple different pseudonymous tokens. The users 101A, 101B, using their personal computer and/or computing electronic devices can share their sensitive information or data to a third-party vendor that receives the sensitive information or data. For example, a patient filling out a health form on a hospital or a physician's website; or a prospective homebuyer filling out a loan application on a bank's website, are some examples where sensitive information or data is often shared with third-party vendors. Accordingly, such third-party vendors can include, for example, including but not limited to, hospitals, banks, social media websites, and/or online traders that often require input of sensitive information or data.

According to the inventive concepts disclosed herein, it would be appreciated by one skilled in the art that, in the field of cryptography, "ciphertext" can refer to data that has been encrypted, wherein the pre-encryption text can be either plaintext or itself another ciphertext. "Encryption" can refer to the process of encoding a message (i.e., plaintext) so that it can be read only by the sender and the intended recipient. And, an "encryption key" (hereinafter referred to as "key") is a bit sequence created for scrambling and unscrambling data. The size of the key can be defined by the number of bits it has, which can be, for example, $2^n$, where n is an integer greater than one (1). As such, for example, an encryption key can be 64-bit, 128-bit, or 256-bit, etc. The inventive concepts disclosed herein are not limited or specific to a particular encryption key size.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, cellular telephones, smart phones, personal integrated communication or entertainment devices, and/or any other device capable of executing a set of instructions and processing an incoming data signal.

Upon receiving such sensitive information or data, one or more servers 102 process such information using special computer-implemented algorithm and software to generate a plurality of pseudonymous tokens (discussed in more detail below). A plurality of pseudonymous tokens are stored in a database 104 for purposes of later processing, retrieval and analysis.

Figure 2:
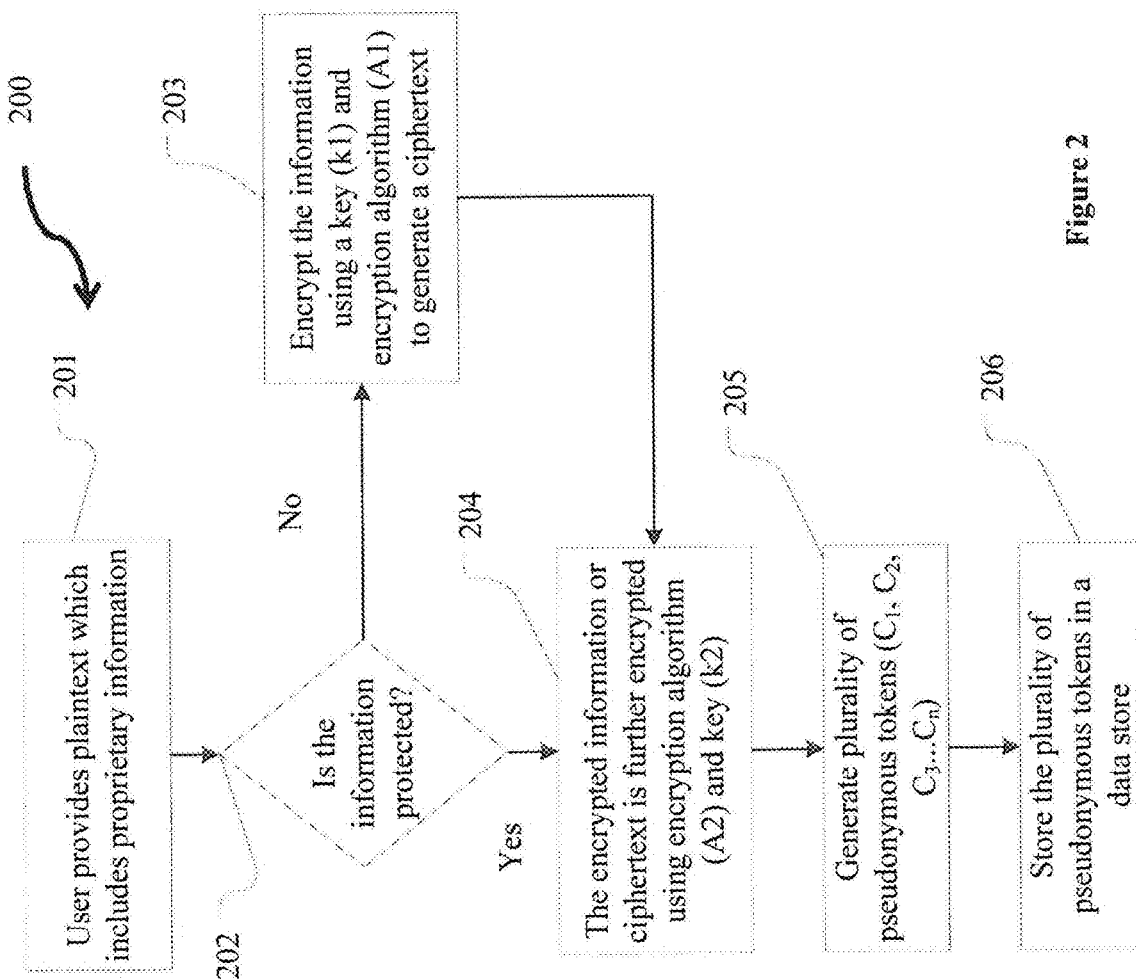
FIG. 2 illustrates a specialized algorithm in the form of a flowchart which describes the process of receiving sensitive information or data from users, and converting such information into plurality of ciphertexts.

Now referring to FIG. 2, a specialized algorithm 200 is depicted in the form of a flowchart for purposes of illustrating the process of receiving sensitive information or data from one or more users, and generating a plurality of ciphertexts from such received sensitive information or data.

With respect to FIG. 2, a specialized algorithm 200 is illustrated. At step 201, information is received that includes sensitive information. Such information can be, for example, transmitted from the respective PCs, PDAs or handheld devices of users' 101A-101B, to the one or more servers 102 illustrated in FIG. 1. In this case, the one or more servers 102 can be at a storage facility of an entity collecting or requesting such sensitive information or data, such as a bank or a hospital, for example. The one or more servers 102 may receive a request that includes user's 101A, 101B sensitive information in encrypted form. That is, the sensitive information transmitted by users 101A, 101B may already be encrypted using a data owner's key. Upon transmitting such sensitive information to the one or more server 102, shown in FIG. 1, the user 101A, 101B may exercise their "right to be forgotten" with respect to the data owner's key pursuant to the GDPR rules. As such, one or more servers 102 receiving sensitive information from users 101A, 101B that is already encrypted using data owner's key, may then forget the data owner's key in order to protect user's identity and sensitive information, and thereby be in compliance with the GDPR rules.

With respect to step 202, the one or more servers 102 receiving the sensitive information the users 101A, 101B determine whether the sensitive information or plaintext (P) provided is protected. If the sensitive information or plaintext (P) is not protected, then a ciphertext or a hash value of the plaintext (P) can be generated, as shown at step 203, by processing the sensitive information through an encryption algorithm (A1) using a key (k1) or by applying a secure hashing algorithm. However, if it is determined that the sensitive information is already protected (for example, if the one or more users 101A, 101B provided the confidential information as a ciphertext or a hashed value), then the process proceeds to step 204.

At step 204 the ciphertext is further encrypted by using a polymorphic symmetric encryption algorithm (A2) and key (k2) to generate one or more pseudonymous tokens as shown in step 205. The one or more pseudonymous tokens can be generated by encrypting a ciphertext using the polymorphic encryption algorithm (A2) and an encryption key (k2). After the one or more pseudonymous tokens have been generated, they are stored in a data store in step 206. The data store may be a structured database, in which case the pseudonymous tokens can be stored in tables of the database. The data store can also be unstructured or semi-structured, such as document with a field identifier.

The polymorphic symmetric encryption algorithm used in step 205 can be represented by the following equation:

$$C_i = E_{K2}^{Poly}(H(P)) \quad (1)$$

In this equation "H(P)" refers to ciphertext generated by encryption or hashing of a plaintext (P). The plaintext (P) being the sensitive information or data provided by the users 101A, 101B. For example, as discussed above, the one or more users 101A, 101B can provide sensitive information, which constitutes plaintext (P). "$E_{K2}^{Poly}$" refers to polymorphic encryption of ciphertext H(P) using key (k2). And, lastly "$C_i$" refers to the resulting pseudonymous token that is obtained after encrypting the ciphertext H(P). Upon running this algorithm for a first time on a ciphertext H(P), will result in a first pseudonymous token $C_1$; running this algorithm for a second time on the same ciphertext H(P) will result in a second pseudonymous token $C_2$, so on and so forth. Thereby, resulting in a one or more pseudonymous tokens 103 ($C_1, C_2, C_3 \ldots C_n$), wherein each pseudonymous token ($C_n$) is different or distinct from the other c pseudonymous token ($C_{n+1}, C_{n-1}$) in the one or more pseudonymous tokens 103.

When generating one or more pseudonymous tokens 103 ($C_1, C_2, C_3 \ldots C_n$) using equation (1), the set of pseudonymous tokens 103 ($C_1, C_2, C_3 \ldots C_n$ that are specific to the plaintext (P) or to the ciphertext H(P) will all share some common property or characteristic that can be exposed through a series of one or more transformations ($T_1, T_2, \ldots T_n$) without exposing the plaintext. For example, given pseudonymous token $C_1$ and pseudonymous token $C_2$, both generated from the same ciphertext, a series of transformations could be applied to $C_1$ and $C_2$ to generate corresponding transformed values:

$$T_x(C_1) = TV_1$$

$$T_x(C_2) = TV_2$$

Where x≥1, "$T_x$" corresponds to one or more transformations, and "TV" is the transformed value. The transformed values $TV_1$ and $TV_2$ would then be compared to determine whether they are equal or share some common property. If so, it would then be determined that $C_1$ and $C_2$ both correspond to the same ciphertext, without revealing or exposing that plaintext.

The common property or characteristic can correspond to specific characteristics that link or correspond each one of the one or more plurality of pseudonymous tokens 103 ($C_1, C_2, C_3 \ldots C_n$ to the plaintext (P) or to the ciphertext H(P) from which the set of pseudonymous tokens are derived or generated. For example, for a specific ciphertext H(P) transformed values TV can include byte sequences or unique set of numbers that can be included in each one of the one or more pseudonymous tokens corresponding to that specific ciphertext H(P). Such transformed values can be included in the beginning, in the end, or in a specific location of the particular pseudonymous token ($C_n$) when such ciphertext is generated using the polymorphic symmetric encryption algorithm. The inventive concepts pertaining to the transformed values corresponding the plurality of pseudonymous tokens 103 ($C_1, C_2, C_3 \ldots C_n$) to the plaintext (P) are not limited to the examples disclosed herein. One skilled in the art would appreciate that other similar variations of what constitutes transformed values TV can be used to achieve the desired result of correlating a particular pseudonymous token ($C_n$) to a particular ciphertext H(P) or plaintext (P).

Figure 3:
FIG. 3 illustrates the plurality of ciphertexts generated after using the polymorphic symmetric encryption algorithm.

Next referring to FIG. 3, example results 300 are illustrated of a generated plurality of pseudonymous tokens after the polymorphic symmetric encryption algorithm is executed using key (k2). For example, plaintext (P) such as "Orange Clown;" "Jeanne d'Arc;" or age "18-34" are encrypted to form plurality of ciphertexts H(P) (not shown). As shown in the results 300, every time a ciphertext H(P) corresponding to the same plaintext (P) is iterated through the polymorphic symmetric encryption algorithm, a different pseudonymous token for the same ciphertext H(P) is generated. For example, every time the ciphertext for the plaintext "Orange Clown" was encrypted through the polymorphic symmetric encryption algorithm, a different pseudonymous token was generated. This process results in different, unique pseudonymous tokens for the same ciphertext H(P) and plaintext (P). According to a non-limiting example embodiment, length of the pseudonymous tokens may be the size of the plaintext (P) plus 4 bytes. For example, plaintext (P) with a size of 16 bytes will have additional 4 bytes added to it, resulting in a size of the ciphertext to be 20 bytes. The inventive concepts disclosed herein are not limited or specific to a specific ciphertext size.

Figure 4:
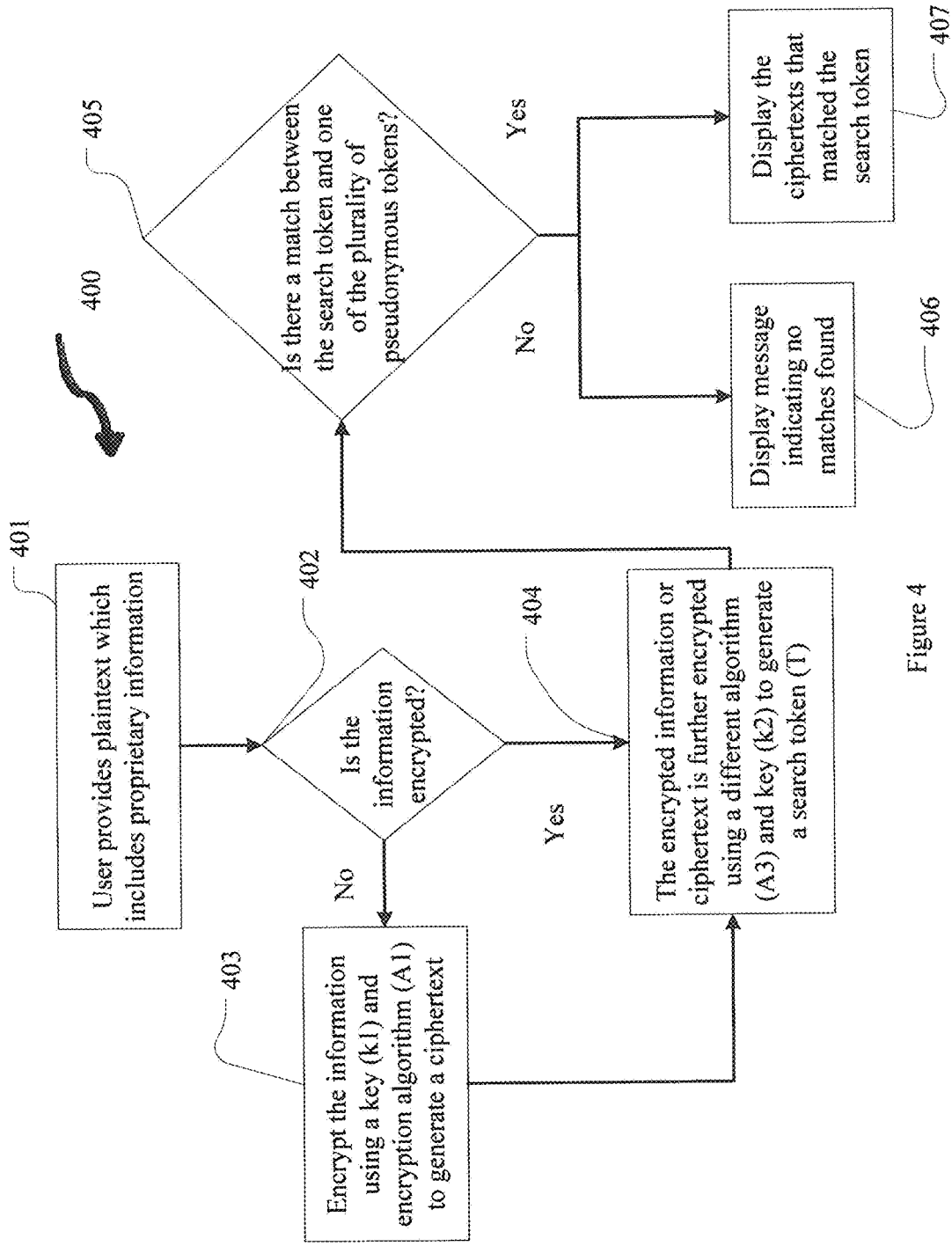
FIG. 4 illustrates a specialized algorithm in the form of a flowchart, which describes the process of matching a search token to a respective one or more of the plurality of ciphertexts.

Next, referring to FIG. 4, a specialized algorithm 400 is depicted in the form of a flowchart for purposes of illustrating the process of matching a search token (T) to a respective one or more of the plurality of pseudonymous tokens 103 ($C_1$, $C_2$, $C_3$ ... $C_n$). As an initial matter, information depicted by steps 401, 402 and 403, in FIG. 4, is same as the information depicted by steps 201, 202 and 203, in FIG. 2, as discussed above. FIG. 4 includes the additional steps of generation of a search token (T) at step 404, searching for a match between the search token (T) to one or more of the plurality of pseudonymous tokens 103 ($C_1$, $C_2$, $C_3$ ... $C_n$) at step 405, and either determining that no matches are found at step 406 or identifying pseudonymous tokens that match the search token.

At step 404 a search token (T) is generated by using a different algorithm (A3) and key (k2). The algorithm used for encrypting the ciphertext H(P) to generate a search token (T) can be the Song-Wagner Perrig symmetric cryptographic algorithm. The following equation depicts the relationship between the search token (T) and the ciphertext H(P):

$$T_{K2}(H(P)) \quad (2)$$

Wherein, "$T_{K2}$" represents the search token (T) that is generated using key (k2) from the ciphertext H(P). And, as noted under equation (1), "H(P)" refers to ciphertext generated by encryption of a plaintext (P). One skilled in the art would appreciate that the inventive concepts disclosed herein are not limited or specific to a specific search token size.

At step 405, a matching process is executed by matching the search token (T) to one or more of the plurality of pseudonymous tokens 103 ($C_1$, $C_2$, $C_3$ ... $C_n$) that were generated as discussed above under step 205 in FIG. 2. In order to execute the matching step at step 405, the specialized processors can first retrieve the plurality of pseudonymous tokens ($C_1$, $C_2$, $C_3$ ... $C_n$) from database 104 that were previously stored, as noted above at step 206 in FIG. 2.

The following equation depicts the matching step at step 405:

$$C_1 ? = T_{K2}(H(P)) \quad (3)$$

Wherein, as noted under equation (1), "$C_1$" refers to the resulting one or more pseudonymous tokens that are obtained after encrypting the ciphertext H(P); and under equation (2), "$T_{K2}$" represents the search token (T) that is generated using key (k2) from the ciphertext H(P). "H(P)" refers to ciphertext generated by encryption of a plaintext (P). The "?=" represents the determination that is being achieved at step 405—whether or not there is a match between the search token (T) and one or more of the plurality of pseudonymous tokens 103 ($C_1$, $C_2$, $C_3$ ... $C_n$).

During the matching step 405, one or more transformed values $TV_{ST}$ are generated from the search token (T) such that the transformed values $TV_{ST}$ can be correlated to a particular underlying ciphertext H(P) or the plaintext (P). This process is similar to the process for generating transformed values, described earlier, that can be used to determine whether two pseudonymous tokens correspond to the same ciphertext H(P) or the same plaintext (P). That is, the search token (T) is specific to the plaintext (P) or to the ciphertext H(P) that will all share some common property or characteristic that can be exposed through a series of one or more transformations ($T_1$, $T_2$, ... $T_n$) without exposing the plaintext (P). For example, given a search token (T) and a pseudonymous token ($C_n$), both generated from the same ciphertext (P), a series of transformations could be applied to search token (T) and pseudonymous token ($C_n$) to generate corresponding transformed values:

$$T_x(T) = TV_{ST}$$

$$T_x(C_n) = TV_{PT}$$

Where x≥1, "$T_x$" corresponds to one or more transformations, and "TV" is the transformed value. The transformed values $TV_{ST}$ may correspond to specific characteristics or properties that link or correspond the search token (T) to the ciphertext H(P) or plaintext (P) from which the search token (T) is derived or generated. During the matching step 405, the transformed values $TV_{ST}$ for the search token (T) may be transformed once. The inventive concepts pertaining to the transformed values $TV_{ST}$ are not limited to the examples disclosed herein. One skilled in the art would appreciate that other similar variations of what constitutes transformed values $TV_{ST}$ can be used to achieve the desired result of correlating a particular search token (T) to a particular ciphertext H(P) or a particular plaintext (P).

The matching process 405 also generates one or more transformed values, $TV_{PT}$, corresponding to each of the plurality of pseudonymous tokens 103 ($C_1$, $C_2$, $C_3$ ... $C_n$). The transformations used to generate the set of transformed values, $TV_{PT}$, for each of the pseudonymous tokens 103 ($C_1$, $C_2$, $C_3$ ... $C_n$) are reciprocal to those used to generate the transformed values of the search token (T), $TV_{ST}$. Additionally, it is noted that the transformations used to generate the transformed values, $TV_{PT}$, for each pseudonymous token of the plurality of pseudonymous tokens 103 ($C_1$, $C_2$, $C_3$ ... $C_n$) are different than the polymorphic encryption (A2) and key (k2) used to generate the pseudonymous token. In other words, the transformations applied to generate $TV_{ST}$ are not, for example, a decryption algorithm that would expose the value of the underlying ciphertext. During the matching step 405, the transformed values $TV_{PT}$ for each of the plurality of pseudonymous tokens 103 may be transformed at least once.

The matching process 405 then compares the transformed values corresponding to the search token (T), $TV_{ST}$, with the transformed values corresponding to each of the pseudonymous tokens 103 ($C_1$, $C_2$, $C_3$ ... $C_n$), $TV_{PT}$, to determine if there is a match between the search token (T) and one or more of the plurality of pseudonymous tokens 103 ($C_1$, $C_2$, $C_3$ ... $C_n$). That is, the transformed values $TV_{ST}$ and $TV_{PT}$ are compared to determine whether they are equal or share some common property. Note that this comparison is not necessarily a strict equals match, numerical match, or string match between transformed values $TV_{ST}$ and $TV_{PT}$. The comparison can also compare one or more properties or attributes of transformed values $TV_{ST}$ and $TV_{PT}$ to determine whether they share a common property.

If a match is found at step 405, then at step 407 the pseudonymous tokens 103 that matched the search token (T) are identified and can be returned, for example, in response to a query or as part of executing a query. Otherwise, if there are no matches, then at step 406 a determination that there are no matching pseudonymous tokens is identified, for example, in response to a query or as part of executing a query. The matching of the search token (T) and pseudonymous token ($C_n$), both corresponding to the same ciphertext H(P), do not reveal or expose the plaintext (P). As shown above, the methods disclosed herein achieve the result of matching a search token (T) to a plurality of distinct pseudonymous tokens 103 ($C_1, C_2, C_3 \ldots C_n$) that correspond to that search token (T) without requiring decryption of either the search token (T) or any of the distinct pseudonymous tokens 103 ($C_1, C_2, C_3 \ldots C_n$). The ciphertext values H(P) underlying the search token (T) and the pseudonymous tokens 103 ($C_1, C_2, C_3 \ldots C_n$) are therefore never exposed during any part of the search process.

Accordingly, if a vendor, such as hospitals and/or banks, for example, wants to perform data analysis without accessing the 'raw' data (i.e., original data or plaintext (P) data) that contains sensitive information, while maintaining compliance with the GDPR rules and regulations, they can do so using the above mentioned methods, processes and systems. Such methods, processes and systems enable the hospitals and banks, for example, to process personal data in a way that the data can no longer be attributed to a specific data subject. Thereby, achieving the desired goals of data analysis without compromising a data subject's sensitive information or data and/or violating the GDPR rules and regulations.

Figure 5B:
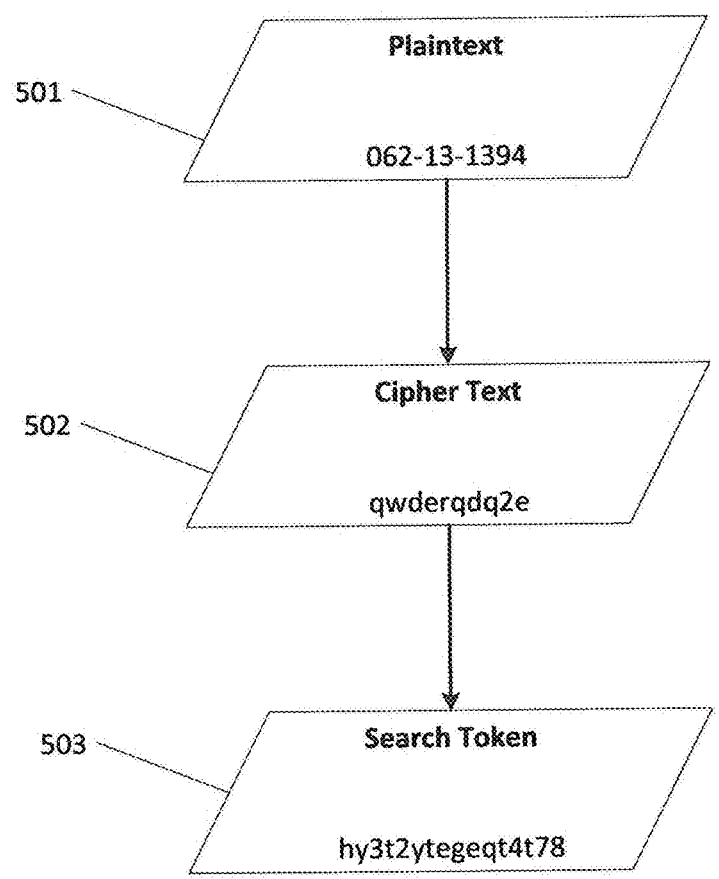
Figure 5C:
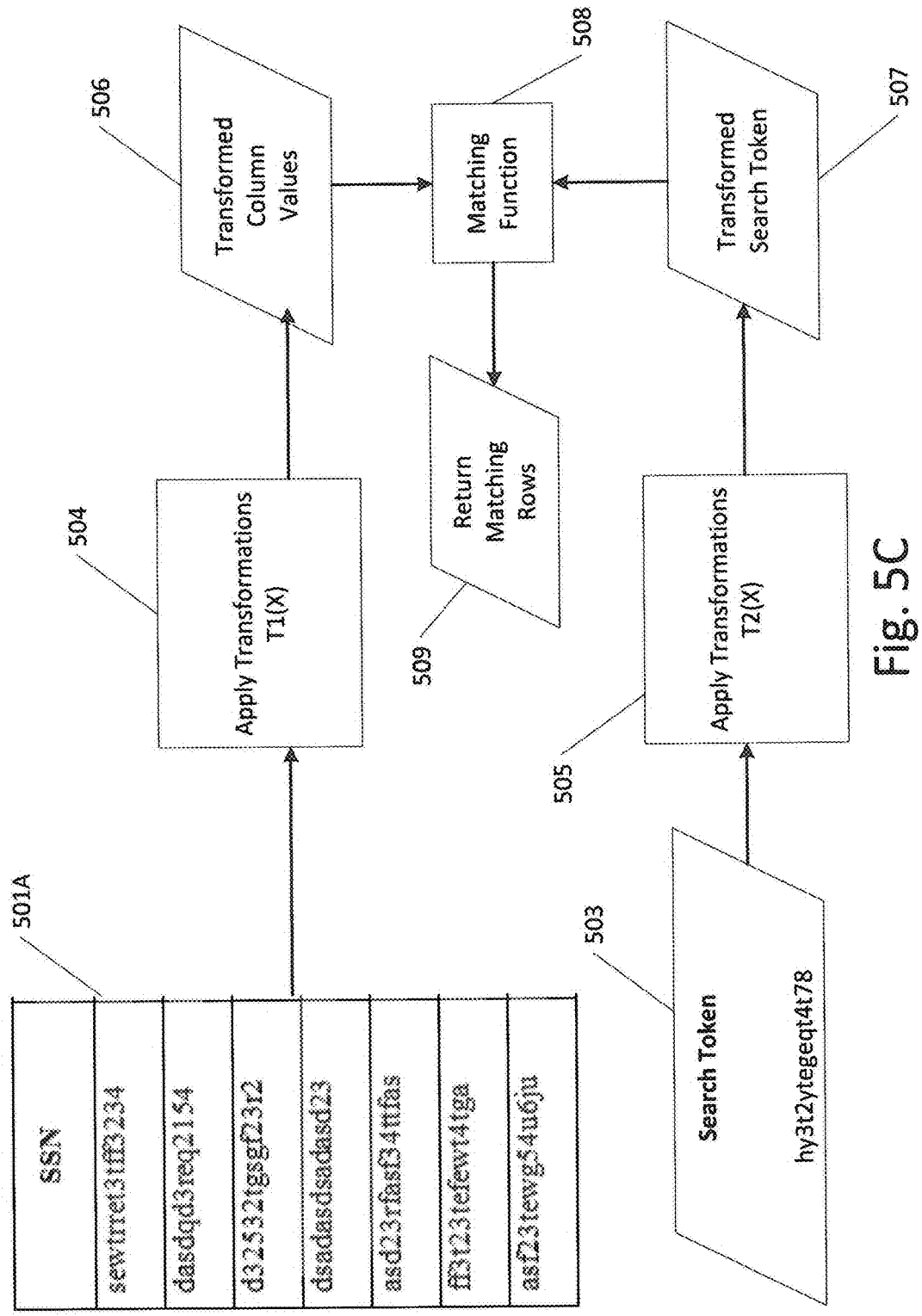

FIGS. 5A-5C illustrate an example of the search process that can be performed using the disclosed data structures and methods according to an exemplary embodiment.

FIG. 5A illustrates a sample data table 500 in a database. Table 500 includes columns 500A, 500B, 500C, and 500D. As shown in FIG. 5A, column 500A corresponds to social security number (SSN) that is stored in encrypted form as pseudonymous tokens. The remaining columns are stored as plaintext in this example, but of course, one or more of the other columns can be stored in encrypted form as well.

FIG. 5B illustrates the process of conversion from plain text 501 to cipher text 502 and subsequently a search token 503. The search token value 503 shown in FIG. 5B can correspond to a search token that is used to search a database and can be generated using any of the earlier described techniques.

For example, a research institution can store plain text information in a secure remote location separate from the main database. The relevant plain text 501 value can be encrypted using a cryptographic key provided by the data subject at the remote location to generate ciphertext. Alternatively, the remote location can store only ciphertext that has been provided by data subject and not have access to plaintext.

If the encryption used to generate the search token is carried out at the main database, then the ciphertext can then be transmitted in a query to the main database storing the table 500 to retrieve or update corresponding data in the database. In this case, the query can include a command that instructs the main database, or an agent executing at the main database, to perform the necessary encryption when executing the query. Alternatively, if encryption is carried out at the remote location, then the ciphertext can be encrypted at the remote location to generate a search token and the search token can be transmitted as part of a query to the main database to retrieve relevant information.

The query can be any type of query, such as a relational database SQL select or update query. For example, assuming that table 500 is called "IncomeDisparity" and that the encryption used to generate the search token is carried out at the remote location prior to transmitting the query to the main database, the query can be:

SELECT*from IncomeDisparity

WHERE ($T_{x1}$ (search token)=$T_{x2}$ (SSN))

In this case, the query refers to one or more first transformations that are applied to the search token and $T_{x2}$, wherein $T_{x2}$ refers to one or more second transformations that are applied to the pseudonymous tokens in the SSN column. The first transformations, $T_{x1}$, can be applied at, for example, the main database, at the remote location, or at an intermediate node, such as a database network router between the remote location and the main database. For example, the query can include one or more commands (such as commands to apply transformations), that are interpreted by an agent at the main database and then used to look up and apply the corresponding transformations prior to evaluating the condition in the query.

FIG. 5C illustrates the process used to match a search token 503 to one or more of the pseudonymous tokens 500A. At step 505 transformations ($T_2(X)$) are applied to the search token 503 to generate a transformed search token 507. Similarly, at step 504 transformations ($T_1(X)$) are applied to each of the pseudonymous tokens in column 500A to generate transformed column values 506. Column 500A can be selected, for example, based on a domain specified in a query. At step 508 the transformed column values 506 and the transformed search token 507 are compared using a matching function. Matching function can, for example, use an equals match, numerical match, or string match. Matching function can also compare properties of the transformed column values and the transformed search token. The matching function identifies any rows having a transformed column value 506 that matches the transformed search token 507. At step 509 the rows having transformed column values that match the transformed search token are returned.

Figure 6A:
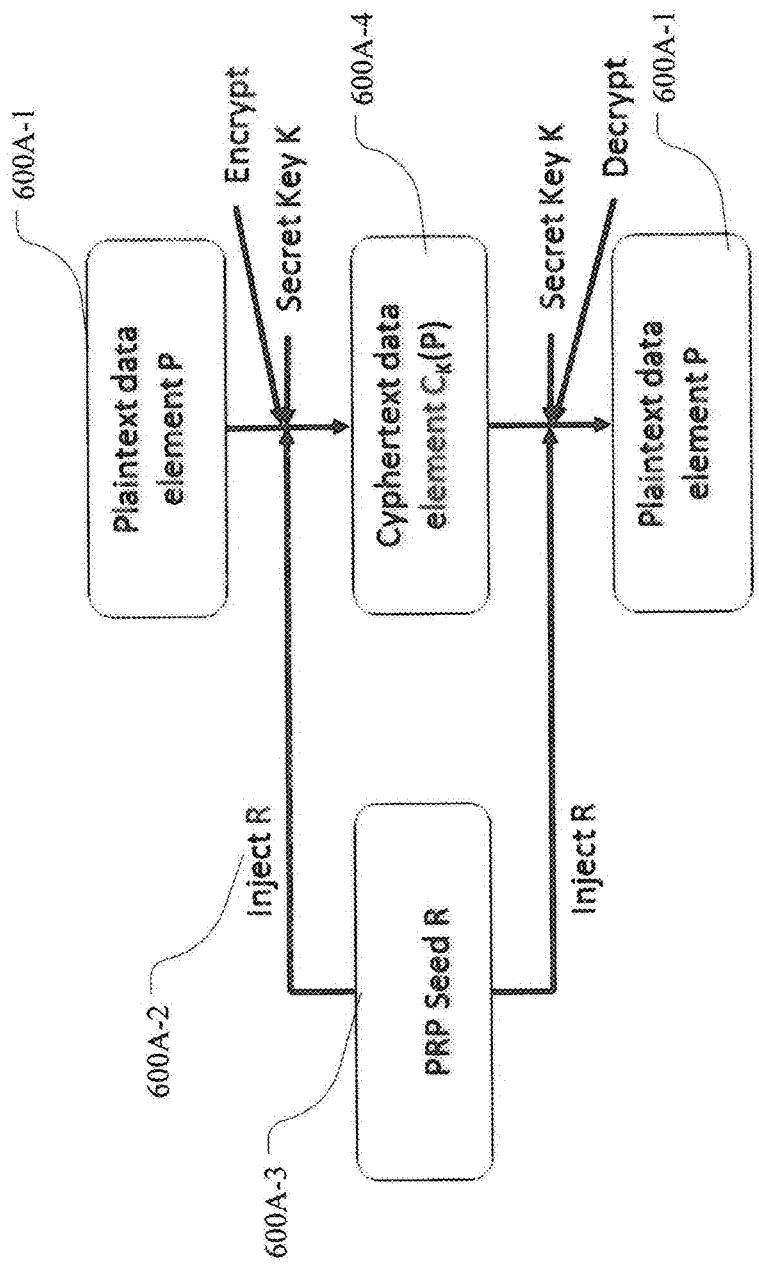
FIG. 6A illustrates a standard model of using a Song-Wagner Perrig (SWP) symmetric cryptographic algorithm.

Now referring to FIG. 6A. According to a non-limiting exemplary embodiment, FIG. 6A illustrates standard use of a polymorphic symmetric encryption algorithm such as, but not limited to, the Song-Wagner Perrig (SWP) algorithm. Under a standard model, plaintext data element P 600A-1 is encrypted with a key (k). As part of encryption process of the plaintext data element P, Pseudo Random Permutation (PRP) seed R 600A-3 is injected into the plaintext data element P as noted by 600A-2. Such an injection process results in polymorphic ciphertext data element $C_K(P)$ 600A-4.

Thereafter, when the polymorphic ciphertext data element $C_K(P)$ 600A-4 is to be decrypted with key (k), the PRP seed R 600A-3 must be injected into the decryption process along with key (k). Such operation results in recovering back the plaintext data element P 600A-1. One skilled in the art will appreciate that presence of the PRP seed R 600A-3 may not be required during a matching operation. In this illustration shown in FIG. 6A, the PRP seed R 600A-3 injected during the encryption process must be preserved somewhere in a database for purposes of later performing the decryption operation. Such storage of the PRP seed R 600A-3 for later use in the decryption process results in increased metadata management, complexity and decreased system-wide reliability.

Figure 6B:
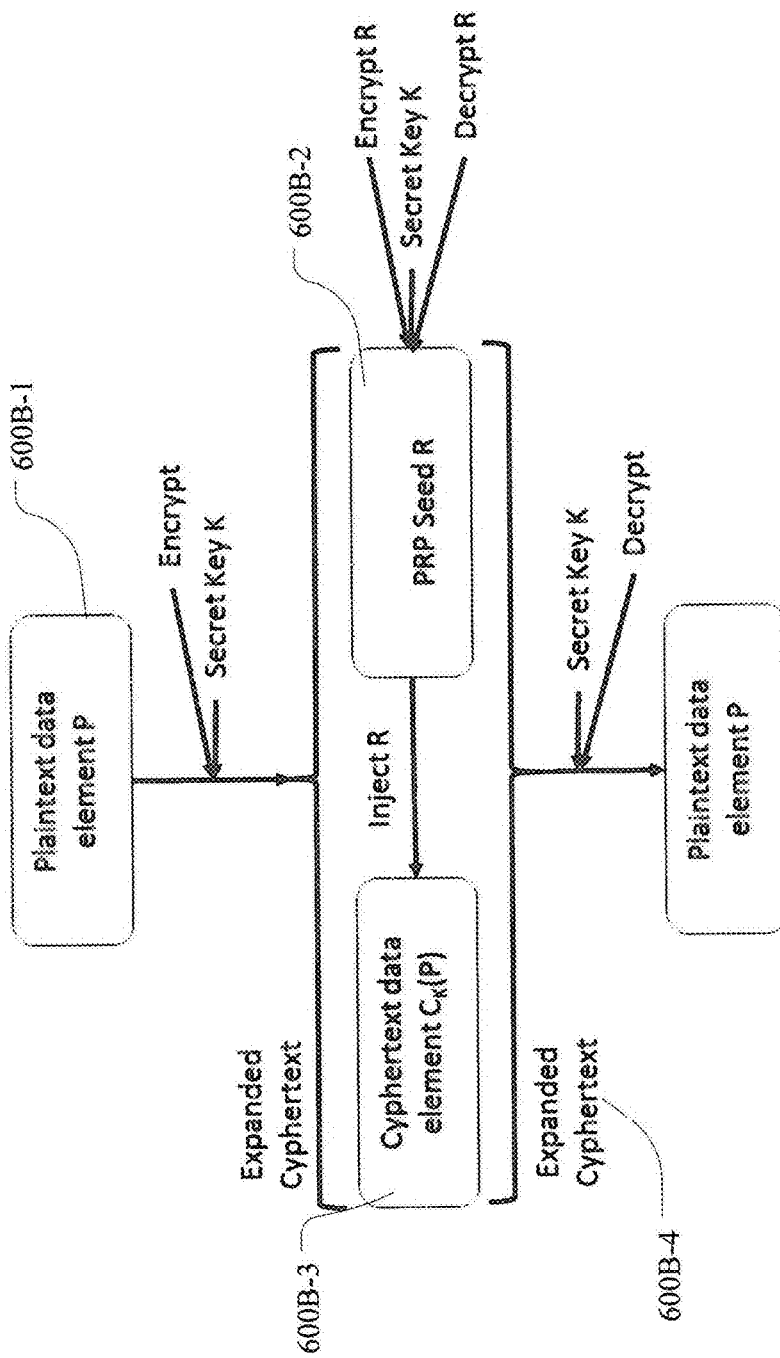
FIG. 6B-C illustrates an example embodiment of a specialized algorithm where an expanded cipher text is described.
Figure 6C:
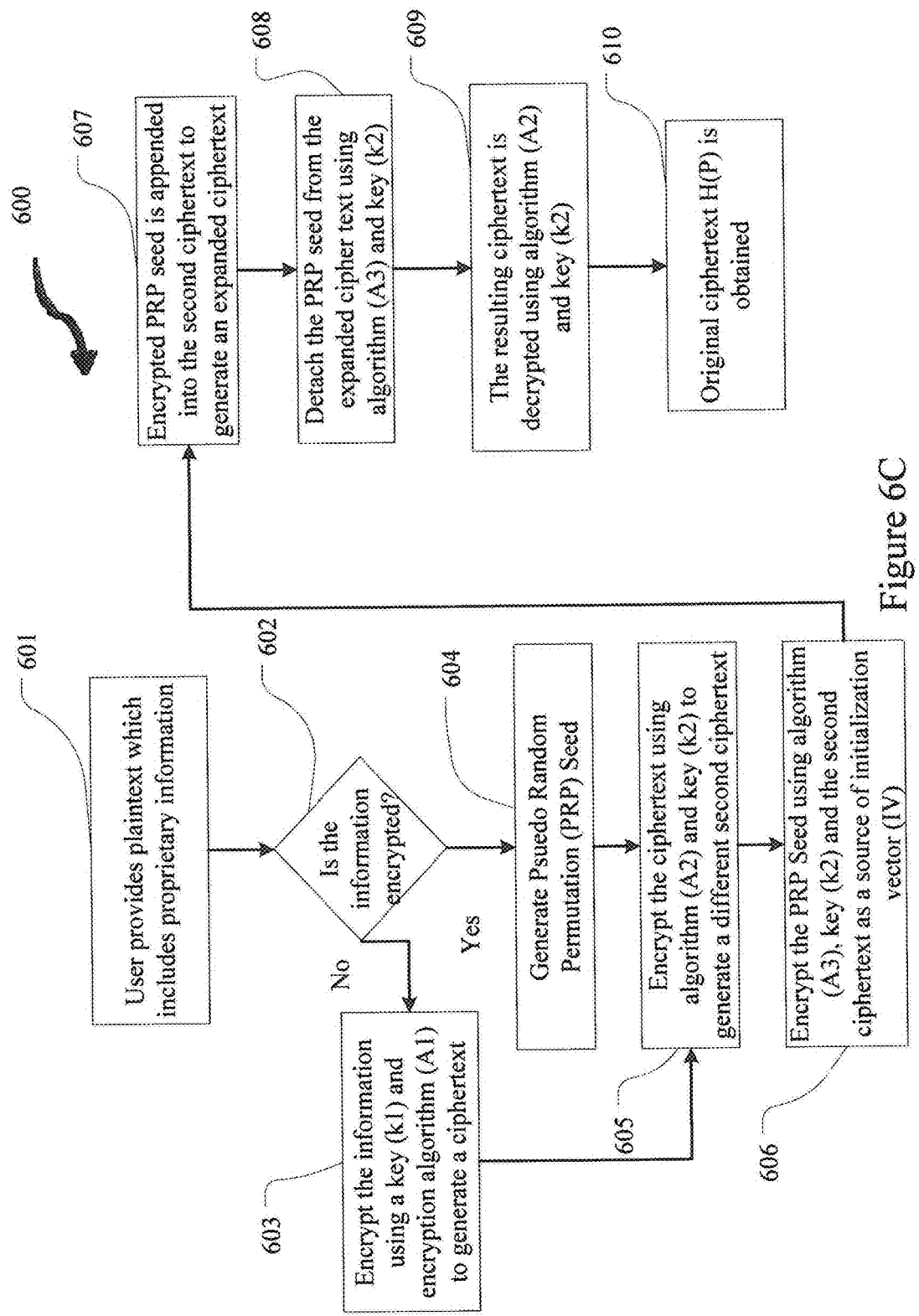

Now referring to FIGS. 6B-C. FIG. 6B represents an improvement over the conventional methods disclosed in FIG. 6A; and FIG. 6C illustrates the algorithm undertaken in FIG. 6B in a flowchart. As shown in FIG. 6B, plaintext data element P 600B-1 is encrypted with a key (k) and augmented by Pseudo Random Permutation (PRP) Seed R 600B-2. The PRP Seed R 606B-2 is injected in the process of the encryption operation. This encryption operation generates polymorphic ciphertext data element $C_K(P)$ 600B-3. The PRP Seed R 600B-2 is appended to ciphertext data element $C_K(P)$ 600B-3, and is encrypted with a stream cipher or a block cipher in the stream mode of operation using key (k), which results in forming or generating an expanded ciphertext 600B-4. Since size of the PRP Seed R 600B-2 is constant, the element's position in expanded ciphertext 600B-4 is deterministic.

Now referring to FIG. 6C, which is representative of a flowchart implementation of what is illustrated in FIG. 6B, a specialized algorithm (600) is shown where an expanded cipher text is illustrated. As an initial matter, information depicted by steps 601, 602 and 603 is same as information depicted by steps 201, 202 and 203, in FIG. 2, as discussed above. After the specialized processors at the one or more servers 102, shown in FIG. 1, receives the ciphertext H(P), it generates a Pseudo Random Permutation (PRP) seed at step 604. At 605, the one or more servers 102 encrypt the ciphertext C1 using different algorithm (A2) and key (k2) thus generating a different second ciphertext. One skilled in the art would appreciate that the encryption algorithm can be, for example, Song-Wagner-Perrig symmetric cryptographic algorithm. Next, at step 606, the server encrypts said PRP seed using cryptographic algorithm (A3), key (k2) and the second ciphertext as a source of an initialization vector (IV). One skilled in the art would appreciate that the PRP seed can be encrypted using a stream cipher such as the RC4 cipher, the Turing cipher or a block cipher algorithm in a stream cipher mode of operation such as Output Feedback Mode (OFB), Counter Mode (CTR) or Galois Counter Mode (GCM). One skilled in the art would appreciate that the initialization vector (IV) can be generated using a cryptographically secure hash algorithm such as SHA-256, SHA-3, etc. The size of the PRP seed is selected such that it satisfies requirements of the algorithm (A2).

Next, at step 607, the encrypted PRP seed can be appended into the ciphertext to generate an expanded ciphertext. That is, the PRP seed can be added in the beginning of the second ciphertext or at the end of the second ciphertext, in order to form the expanded ciphertext. In essence, the expanded ciphertext is a combination of the second ciphertext and the encrypted PRP seed.

One skilled in the art would appreciate that the PRP Seed R 600B-2 is encrypted by the means of the AES cipher is the stream mode of operation. A proper IV for the encryption operation is derived by computing a SHA-256 cryptographic hash value of ciphertext data element $C_K(P)$ 600B-3, and taking leftmost 16 bytes of said computed hash value. Further, it will be appreciated by one skilled in the art that other encryption algorithms such as SEAL or TDEA may be used for encrypting ciphertext data element $C_K(P)$ 600B-3 and other hash algorithms, such as MD5 or the SHA-3 family, may be used to produce a suitable IV. It is also appreciated that an encryption algorithm which does not require an IV, such as RC4+ or Spritz, may be used for encryption. It is also appreciated that IV may be derived using a different approach such as using a fixed value Still referring to FIG. 6C, the decryption process will be described with respect to steps 608, 609 and 610. In order to trace back to the plaintext (P) from the expanded ciphertext, the specialized processors at the one or more servers 102, as shown in FIG. 1, detaches the encrypted PRP seed from the expanded ciphertext as noted in step 608. As noted above, the encrypted PRP seed is appended to the ciphertext during the encryption process. For decryption, the encrypted PRP seed is detached from the ciphertext and decrypted using algorithm (A3) and key (k2). Next, as noted in step 609, the resulting ciphertext is decrypted using algorithm (A2) and key (k2). Thereafter, the original ciphertext H(P) is obtained, as noted in step 610.

According to non-limiting exemplary embodiments disclosed herein, inventive concepts are directed to at least a method executed by one or more computing devices for searching polymorphically encrypted data. The method comprising generating, by at least one of the one or more computing devices, one or more pseudonymous tokens by encrypting a ciphertext using a first algorithm and an encryption key, the first algorithm comprising a polymorphic algorithm configured to generate a distinct pseudonymous token for each application of the polymorphic algorithm to the same ciphertext; storing, by at least one of the one or more computing devices, the one or more pseudonymous tokens in a data store; and identifying, by at least one of the one or more computing devices, data in the data store that corresponds to the ciphertext by querying the database using a search token generated by encrypting the ciphertext using a second algorithm and the encryption key, the search token being distinct from the one or more pseudonymous tokens. The second algorithm being different from the first algorithm.

The identifying data in the data store that corresponds to the ciphertext by querying the database using the search token generated by encrypting the ciphertext using the second algorithm and the encryption key comprises, applying one or more first transformations to one or more columns containing the one or more pseudonymous tokens to generate one or more transformed columns; applying one or more second transformations to the search token to generate a transformed search token; and identifying one or more rows corresponding to the ciphertext based at least in part on the one or more transformed columns and the transformed search token.

The identifying of the one or more rows corresponding to the ciphertext based at least in part on the one or more transformed columns and the transformed search token comprises, comparing each transformed column value in the one or more transformed columns to the transformed search token using a matching function to identify one or more matching transformed column values; and identifying one or more rows containing the one or more matching transformed column values as corresponding to the ciphertext.

The method for searching polymorphically encrypted data further comprises displaying, by at least one of the one or more computing devices, a first result if the search token is matched with the one or more pseudonymous tokens of a plurality of pseudonymous tokens, the first result including a list of at least one pseudonymous tokens; and displaying, by at least one of the one or more computing devices, a different second result if the search token does not match with the one or more pseudonymous tokens of the plurality of pseudonymous tokens.

The method for searching polymorphically encrypted data further comprises modifying, by at least one of the one or more computing devices, the distinct pseudonymous token of the plurality of pseudonymous tokens by adding a respective one of one or more pseudo random permutation (PRP) seeds in the distinct pseudonymous token.

The method for searching polymorphically encrypted data further comprises encrypting, by at least one of the one or more computing devices, the respective one of the one or more PRP seeds using a different third algorithm and the encryption key, wherein the adding the respective one of the one or more PRP seeds includes adding the respective PRP seed either before or after the distinct pseudonymous token.

The method for searching polymorphically encrypted data further comprises encrypting, by at least one of the one or more computing devices, the one or more PRP seeds based on content of the distinct pseudonymous token as an initialization vector.

The method for searching polymorphically encrypted data further comprises detaching, by at least one of the one or more computing devices, the encrypted one or more PRP seeds; and decrypting, by at least one of the one or more computing devices, the encrypted one or more PRP seeds using the third algorithm and the encryption key.

The method for searching polymorphically encrypted data further comprises decrypting, by at least one of the one or more computing devices, the one or more PRP seeds based on content of the distinct pseudonymous token as an initialization vector; and decrypting, by at least one of the one or more computing devices, the respective pseudonymous token using a decryption first algorithm and the encryption key after detaching the respective PRP seed from the distinct pseudonymous token.

According to non-limiting exemplary embodiments disclosed herein, inventive concepts are directed to a system for searching polymorphically encrypted data, comprising one or more processors; and one or more memories operatively coupled to at least one of the one or more processors and having instructions stored thereon. The instructions when executed by at least one of the one or more processors, cause at least one of the one or more processors to, generate one or more pseudonymous tokens by encrypting a ciphertext using a first algorithm and an encryption key, the first algorithm comprising a polymorphic algorithm configured to generate a distinct pseudonymous token for each application of the polymorphic algorithm to the same ciphertext; store the one or more pseudonymous tokens in a data store; and identify data in the data store that corresponds to the ciphertext by querying the database using a search token generated by encrypting the ciphertext using a second algorithm and the encryption key, the search token being distinct from the one or more pseudonymous tokens.

The at least one of the one or more memories include further instructions stored thereon that, when executed by at least one of the one or more processors, cause at least one of the one or more processors to, apply one or more first transformations to one or more columns containing the one or more pseudonymous tokens to generate one or more transformed columns; apply one or more second transformations to the search token to generate a transformed search token; and identify one or more rows corresponding to the ciphertext based at least in part on the one or more transformed columns and the transformed search token.

The at least one of the one or more memories include further instructions stored thereon that, when executed by at least one of the one or more processors, cause at least one of the one or more processors to compare each transformed column value in the one or more transformed columns to the transformed search token using a matching function to identify one or more matching transformed column values; and identify one or more rows containing the one or more matching transformed column values as corresponding to the ciphertext.

The at least one of the one or more memories include further instructions stored thereon that, when executed by at least one of the one or more processors, cause at least one of the one or more processors to modify the distinct pseudonymous token of the plurality of pseudonymous tokens by adding a respective one of one or more pseudo random permutation (PRP) seeds in the distinct pseudonymous token.

The at least one of the one or more memories include further instructions stored thereon that, when executed by at least one of the one or more processors, cause at least one of the one or more processors to encrypt the respective one of the one or more PRP seeds using a different third algorithm and the encryption key, wherein the adding the respective one of the one or more PRP seeds includes adding the respective PRP seed either before or after the distinct pseudonymous token.

The at least one of the one or more memories include further instructions stored thereon that, when executed by at least one of the one or more processors, cause at least one of the one or more processors to encrypt the one or more PRP seeds based on using the content of the distinct pseudonymous token as an initialization vector when encrypting one or more PRP seeds.

The at least one of the one or more memories include further instructions stored thereon that, when executed by at least one of the one or more processors, cause at least one of the one or more processors to detach the encrypted one or more PRP seeds; and decrypt the encrypted one or more PRP seeds using the third algorithm and the encryption key.

The at least one of the one or more memories include further instructions stored thereon that, when executed by at least one of the one or more processors, cause at least one of the one or more processors to decrypt the one or more PRP seeds based on using the content of the distinct pseudonymous token as an initialization vector when decrypting one or more PRP seeds.

According to non-limiting exemplary embodiments disclosed herein, inventive concepts are directed at least one non-transitory computer-readable medium storing computer-readable instructions that, when executed by one or more computing devices, cause at least one of the one or more computing devices to, generate one or more pseudonymous tokens by encrypting a ciphertext using a first algorithm and an encryption key, the first algorithm comprising a polymorphic algorithm configured to generate a distinct pseudonymous token for each application of the polymorphic algorithm to the same ciphertext; store the one or more pseudonymous tokens in a data store; and identify data in the data store that corresponds to the ciphertext by querying the database using a search token generated by encrypting the ciphertext using a second algorithm and the encryption key, the search token being distinct from the one or more pseudonymous tokens.

Each computer program can be stored on an article of manufacture, such as a storage medium (e.g., CD-ROM, hard disk, or magnetic diskette) or device (e.g., computer peripheral), that is readable by a programmable computer for configuring and operating the computer when the storage medium or device is read by the computer to perform the functions of the data framer interface. The systems, apparatuses and methods for searching encrypting data can also be implemented as a machine-readable storage medium, configured with a computer program, where, upon execution, instructions in the computer program cause a machine to operate to perform the functions of searching encrypted data described above.

As used herein, computer program and/or software can include any sequence or human or machine cognizable steps which perform a function. Such computer program and/or software can be rendered in any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., BREW), and the like.

It will be recognized that while certain aspects of the disclosure are described in terms of a specific sequence of steps of a method, these descriptions are only illustrative of the broader methods of the disclosure, and can be modified as required by the particular application. Certain steps can be rendered unnecessary or optional under certain circumstances. Additionally, certain steps or functionality can be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated can be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

Methods disclosed herein can be implemented in one or more processing devices (e.g., a digital processor, an analog processor, a digital circuit designed to process information, an analog circuit designed to process information, a state machine, and/or other mechanism for electronically processing information and/or configured to execute computer program modules stored as computer readable instructions). The one or more processing devices can include one or more devices executing some or all of the operations of methods in response to instructions stored electronically on a non-transitory electronic storage medium. The one or more processing devices can include one or more devices configured through hardware, firmware, and/or software to be specifically designed for execution of one or more of the operations of methods herein.

Further, while the server is described with reference to particular steps, it is to be understood that these steps are defined for convenience of description and are not intended to imply a particular physical arrangement of component parts. Further, the steps need not correspond to physically distinct components. Steps can be configured to perform various operations, e.g., by programming a processor or providing appropriate control circuitry, and various steps might or might not be reconfigurable depending on how the initial configuration is obtained. Implementations of the present inventive concepts can be realized in a variety of apparatus including electronic devices implemented using any combination of circuitry and software.

The processor(s) and/or controller(s) implemented and disclosed herein can comprise both specialized computer-implemented instructions executed by a controller and hard-coded logic such that the processing is done faster and more efficiently. This in turn, results in faster decision making by processor and/or controller, thereby achieving the desired result more efficiently and quickly. Such processor(s) and/or controller(s) are directed to special purpose computers that through execution of specialized algorithms improve computer functionality, solve problems that are necessarily rooted in computer technology and provide improvements over the existing prior art(s) and/or conventional technology. For example, the systems, methods and apparatuses disclosed herein improve computer security during data analysis, search, retrieval, and updating of encrypted data. Further, the novel data structures disclosed herein enable search and analysis of data while maintaining complete anonymity of data, as well as maintaining the "right to be forgotten" in order to be compliant with GDRP's stringent requirements. And, lastly, the techniques disclosed herein implement the "right to be forgotten" in a computationally efficient way such that there is no need to search for and delete data corresponding to a particular person. All that is required is that the initial key used to generate the ciphertext is destroyed. Such techniques allow faster processing than the conventional methods of using a public key, requires significantly less additional storage and is less error prone than the conventional methods of requiring multiple cryptographic keys.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, un-recited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that can be available or known now or at any time in the future.

Further, use of terms like "preferably," "preferred," "desired," or "desirable," and words of similar meaning should not be understood as implying that certain features are critical, essential, or even important to the structure or function of the present disclosure, but instead as merely intended to highlight alternative or additional features that can or cannot be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A method executed by one or more computing devices for searching polymorphically encrypted data, the method comprising:
    generating, by at least one of the one or more computing devices, one or more pseudonymous tokens by encrypting a ciphertext using a first algorithm and an encryption key, the first algorithm comprising a polymorphic algorithm configured to generate a distinct pseudonymous token for each application of the polymorphic algorithm to the same ciphertext with the same encryption key;
    storing, by at least one of the one or more computing devices, the one or more pseudonymous tokens in a data store; and
    identifying, by at least one of the one or more computing devices, data in the data store that corresponds to the ciphertext by querying the data store using a search token generated by encrypting the ciphertext using a second algorithm and the encryption key, the search token being distinct from the one or more pseudonymous tokens.

2. The method of claim 1, wherein identifying data in the data store that corresponds to the ciphertext by querying the data store using the search token generated by encrypting the ciphertext using the second algorithm and the encryption key comprises:
    applying one or more first transformations to one or more columns containing the one or more pseudonymous tokens to generate one or more transformed columns;
    applying one or more second transformations to the search token to generate a transformed search token; and
    identifying one or more rows corresponding to the ciphertext based at least in part on the one or more transformed columns and the transformed search token.

3. The method of claim 2, wherein the identifying of the one or more rows corresponding to the ciphertext based at least in part on the one or more transformed columns and the transformed search token comprises:
    comparing each transformed column value in the one or more transformed columns to the transformed search token using a matching function to identify one or more matching transformed column values; and
    identifying one or more rows containing the one or more matching transformed column values as corresponding to the ciphertext.

4. The method of claim 1, further comprising:
    displaying, by at least one of the one or more computing devices, a first result if the search token is matched with the one or more pseudonymous tokens of a plurality of pseudonymous tokens, the first result including a list of at least one pseudonymous tokens; and
    displaying, by at least one of the one or more computing devices, a different second result if the search token does not match with the one or more pseudonymous tokens of the plurality of pseudonymous tokens.

5. The method of claim 1, further comprising:
    modifying, by at least one of the one or more computing devices, the distinct pseudonymous token of the plurality of pseudonymous tokens by adding a respective one of one or more pseudo random permutation (PRP) seeds in the distinct pseudonymous token.

6. The method of claim 5, further comprising:
    encrypting, by at least one of the one or more computing devices, the respective one of the one or more PRP seeds using a different third algorithm and the encryption key, wherein the adding the respective one of the one or more PRP seeds includes adding the respective PRP seed either before or after the distinct pseudonymous token.

7. The method in claim 6, further comprising:
    encrypting, by at least one of the one or more computing devices, the one or more PRP seeds based on content of the distinct pseudonymous token as an initialization vector.

8. The method of claim 6, further comprising:
    detaching, by at least one of the one or more computing devices, the encrypted one or more PRP seeds; and
    decrypting, by at least one of the one or more computing devices, the encrypted one or more PRP seeds using the third algorithm and the encryption key.

9. The method in claim 8, further comprising:
    decrypting, by at least one of the one or more computing devices, the one or more PRP seeds based on content of the distinct pseudonymous token as an initialization vector.

10. The method of claim 6, further comprising:
    decrypting, by at least one of the one or more computing devices, the respective pseudonymous token using a decryption first algorithm and the encryption key after detaching the respective PRP seed from the distinct pseudonymous token.

11. The method of claim 1, wherein the second algorithm is different from the first algorithm.

12. A system for searching polymorphically encrypted data, comprising:
    one or more processors; and
    one or more memories operatively coupled to at least one of the one or more processors and having instructions stored thereon that, when executed by at least one of the one or more processors, cause at least one of the one or more processors to:

generate one or more pseudonymous tokens by encrypting a ciphertext using a first algorithm and an encryption key, the first algorithm comprising a polymorphic algorithm configured to generate a distinct pseudonymous token for each application of the polymorphic algorithm to the same ciphertext with the same encryption key;

store the one or more pseudonymous tokens in a data store; and identify data in the data store that corresponds to the ciphertext by querying the data store using a search token generated by encrypting the ciphertext using a second algorithm and the encryption key, the search token being distinct from the one or more pseudonymous tokens.

13. The system of claim 12, wherein at least one of the one or more memories has further instructions stored thereon that, when executed by at least one of the one or more processors, cause at least one of the one or more processors to:

apply one or more first transformations to one or more columns containing the one or more pseudonymous tokens to generate one or more transformed columns;

apply one or more second transformations to the search token to generate a transformed search token; and identify one or more rows corresponding to the ciphertext based at least in part on the one or more transformed columns and the transformed search token.

14. The system of 13, wherein at least one of the one or more memories has further instructions stored thereon that, when executed by at least one of the one or more processors, cause at least one of the one or more processors to:

compare each transformed column value in the one or more transformed columns to the transformed search token using a matching function to identify one or more matching transformed column values; and identify one or more rows containing the one or more matching transformed column values as corresponding to the ciphertext.

15. The system of claim 12, wherein at least one of the one or more memories has further instructions stored thereon that, when executed by at least one of the one or more processors, cause at least one of the one or more processors to:

modify the distinct pseudonymous token of the plurality of pseudonymous tokens by adding a respective one of one or more pseudo random permutation (PRP) seeds in the distinct pseudonymous token.

16. The system of claim 15, wherein at least one of the one or more memories has further instructions stored thereon that, when executed by at least one of the one or more processors, cause at least one of the one or more processors to:

encrypt the respective one of the one or more PRP seeds using a different third algorithm and the encryption key, wherein the adding the respective one of the one or more PRP seeds includes adding the respective PRP seed either before or after the distinct pseudonymous token.

17. The system of claim 16, wherein at least one of the one or more memories has further instructions stored thereon that, when executed by at least one of the one or more processors, cause at least one of the one or more processors to:

encrypt the one or more PRP seeds based on using the content of the distinct pseudonymous token as an initialization vector when encrypting one or more PRP seeds.

18. The system of claim 16, wherein at least one of the one or more memories has further instructions stored thereon that, when executed by at least one of the one or more processors, cause at least one of the one or more processors to:

detach the encrypted one or more PRP seeds; and decrypt the encrypted one or more PRP seeds using the third algorithm and the encryption key.

19. The system of claim 18, wherein at least one of the one or more memories has further instructions stored thereon that, when executed by at least one of the one or more processors, cause at least one of the one or more processors to:

decrypt the one or more PRP seeds based on using the content of the distinct pseudonymous token as an initialization vector when decrypting one or more PRP seeds.

20. At least one non-transitory computer-readable medium storing computer-readable instructions that, when executed by one or more computing devices, cause at least one of the one or more computing devices to:

generate one or more pseudonymous tokens by encrypting a ciphertext using a first algorithm and an encryption key, the first algorithm comprising a polymorphic algorithm configured to generate a distinct pseudonymous token for each application of the polymorphic algorithm to the same ciphertext with the same encryption key;

store the one or more pseudonymous tokens in a data store; and identify data in the data store that corresponds to the ciphertext by querying the data store using a search token generated by encrypting the ciphertext using a second algorithm and the encryption key, the search token being distinct from the one or more pseudonymous tokens.

* * * * *